(12) United States Patent
Paras et al.

(10) Patent No.: US 8,804,943 B2
(45) Date of Patent: *Aug. 12, 2014

(54) SYSTEMS AND METHODS FOR ROUTING CALLS

(71) Applicant: Paras & Associates, Albany, CA (US)

(72) Inventors: Melinda Paras, Berkeley, CA (US); Raymond Otake, Concord, CA (US)

(73) Assignee: Paras & Associates, Albany, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/076,047

(22) Filed: Nov. 8, 2013

(65) Prior Publication Data

US 2014/0064475 A1 Mar. 6, 2014

Related U.S. Application Data

(63) Continuation of application No. 11/776,063, filed on Jul. 11, 2007, now Pat. No. 8,588,399.

(60) Provisional application No. 60/834,313, filed on Jul. 28, 2006.

(51) Int. Cl.
*H04M 3/00* (2006.01)

(52) U.S. Cl.
USPC .............................. 379/265.12; 379/265.09

(58) Field of Classification Search
CPC ... H04M 3/51; H04M 3/5166; H04M 3/5183; H04M 3/5191; H04M 3/523; H04M 3/5233; H04M 2203/40; H04M 2203/402; H04M 2203/406; H04M 2203/408
USPC ............ 379/265.01, 265.02, 265.09, 265.12, 379/266.01
See application file for complete search history.

(56) References Cited

U.S. PATENT DOCUMENTS

| | | | |
|---|---|---|---|
| 6,137,800 A | 10/2000 | Wiley et al. |
| 6,647,328 B2 | 11/2003 | Walker |
| 7,640,319 B1 | 12/2009 | Sylvain et al. |
| 2003/0007609 A1 | 1/2003 | Yuen et al. |
| 2004/0006471 A1 | 1/2004 | Chiu |
| 2004/0225499 A1 | 11/2004 | Wang et al. |
| 2007/0160188 A1 | 7/2007 | Sharpe et al. |
| 2007/0263810 A1 | 11/2007 | Sterns |

FOREIGN PATENT DOCUMENTS

WO WO 2008/014407 A2 1/2008

OTHER PUBLICATIONS

International Search Report mailed on Feb. 1, 2008, for PCT Application No. PCT/US07/74498 filed on Jul. 26, 2007, 3 pages.

*Primary Examiner* — Antim Shah
(74) *Attorney, Agent, or Firm* — Leydig, Voit & Mayer, Ltd.

(57) ABSTRACT

An IP-based call center is able to route video and audio calls. The call routing is skills-based, and can be configured to give preference first to representatives or agents associated with an entity, and then to representatives or agents within a network associated with that entity. If no representative is available in-house or in-network, the call can be transferred to an external representative or agent. In other embodiments, an entity can configure prioritized layers for routing calls, in order to favor specific service providers.

17 Claims, 5 Drawing Sheets

|  | Call Count | Total Min | Credit / (Debit) |
|---|---|---|---|
| Calls handled internally | 269 | 2,993.83 |  |
| Calls sent to Other Network Interpreters | 386 | 3,657.32 | ($2,742.99) |
| Calls Received from Other Network Users | 211 | 1,870.15 | $1,402.61 |
| MONTHLY BALANCE | ($1,340.38) | | |

FIG. 5

SYSTEMS AND METHODS FOR ROUTING CALLS

CROSS-REFERENCE TO RELATED APPLICATIONS

This application a continuation of U.S. patent application Ser. No. 11/776,063, filed on Jul. 11, 2007, which claims priority to U.S. Provisional Patent Application No. 60/834,313, filed on Jul. 28, 2006. Both of these prior applications are hereby incorporated herein by reference in their entireties.

BACKGROUND OF THE INVENTION

Call routing systems and call centers are commonly used for a variety of purposes, such as customer service and technical support. Call centers typically connect multiple agents or representatives to receive the calls, then route the calls based on the order they are received, as well as on information collected from the caller. For example, a caller might use the keypad of a telephone to select from a number of options in an automated system, then the call center will route the call to the next available representative based on the numeric input (e.g., a selection for technical support on a monitor issue versus a selection relating to billing).

While these systems are acceptable for many applications, they lack functionality that would be beneficial for other applications. For example, many of these systems do not allow for routing of multiple communication types, including video calls, video conferencing, and other such types. Further, these systems do not typically allow for mixing of communication types, such as allowing a video call to be routed to a non-video resource.

Many of these systems also do not build a significant level of "intelligence" into the routing of communications. In the example above, a caller to a call routing system might be forced to navigate through a series of options, in a tree-like structure, until the caller navigates to an end point in the structure, at which time the call is routed to the next available agent for that end point.

Further, many of these systems do not provide for routing of calls to distributed call agents, instead routing calls to a single call center or small number of call centers each housing a number of agents or representatives.

Further still, these systems typically do not allow for the setting of preferences for specific representatives. Most systems are used for a single entity, and simply route calls to an appropriate person in that entity. Where a system allows calls to be routed either in-house or to an external entity, the routing of the calls still typically is end-point based, where certain options are routed in-house and certain calls are routed to an external entity.

There also exists a business problem whereby some entities need to gain access or purchase interpretation or other such service resources, while other entities need an easy and effective way to provide or sell such services and resources. The entities obtaining and/or providing these services also may want some control over how the service providers are prioritized or selected for specific calls.

It therefore is desirable to provide a communication routing system that addresses these and other deficiencies in existing communications and routing systems.

It also is desirable to provide a marketplace of quality services whereby businesses can access or purchase services, as well as provide or sell services.

It also is desirable to provide a system whereby a business can optimize use of its own services using prioritized searching, such as by first searching for services offered locally or by a business, then searching successive layers of outside services or solutions.

It also is desirable to provide a way to generate additional income for a business by selling excess capacity of the services offered by that company.

BRIEF SUMMARY OF THE INVENTION

Systems and methods in accordance with embodiments of the present invention provide for skills-based routing of video and audio calls. The call routing can be configured to give ordered preference to various layers of providers, such as preference first to representatives or agents associated with an entity and then to representatives or agents within a network associated with that entity or external to that entity.

In one embodiment, a call is received from a requestor that requires a particular skill, such as the ability to interpret a specified language. The received call can be associated with an entity such as a hospital. A priority can specify that the call is routed to a representative of the entity if the representative of the entity has that particular skill and is available to take the call. If a representative of the entity is not available to take the call, the call can instead be routed to a representative of a network associated with the entity if the representative of the network has that particular skill is available to take the call. If a representative of the entity and a representative of the network are not available to take the call, the call is instead routed to an out-of-network representative if the out-of-network representative has that particular skill is available to take the call.

The call also can require or specify additional skills, such as medical training. The call can be an audio call, video call, or combination thereof. The routing can be done using any appropriate system, such as an Internet protocol (IP) based routing system.

In another embodiment, a call is received from a requestor that requires a particular skill, such as the ability to interpret a specified language. The received call can be associated with an entity such as a hospital. A priority can specify that the call is routed to a local representative of the entity if the local representative of the entity has that particular skill and is available to take the call. If a representative of the entity is not available to take the call, the call can instead be routed to a representative of a next successive priority layer, such as a network associated with the entity or an entity within a certain geographical range. If such a representative of the is not available to take the call, the call is instead routed to the next successive layer or even an out-of-network representative if necessary.

A further understanding of the nature and the advantages of the inventions disclosed herein may be realized by reference of the remaining portions of the specification and the attached drawings.

BRIEF DESCRIPTION OF THE DRAWINGS

Various embodiments in accordance with the present invention will be described with reference to the drawings, in which:

FIG. 5 illustrates a sample bill that can be issued in accordance with embodiments of the present invention.

DETAILED DESCRIPTION OF THE INVENTION

Figure 1:
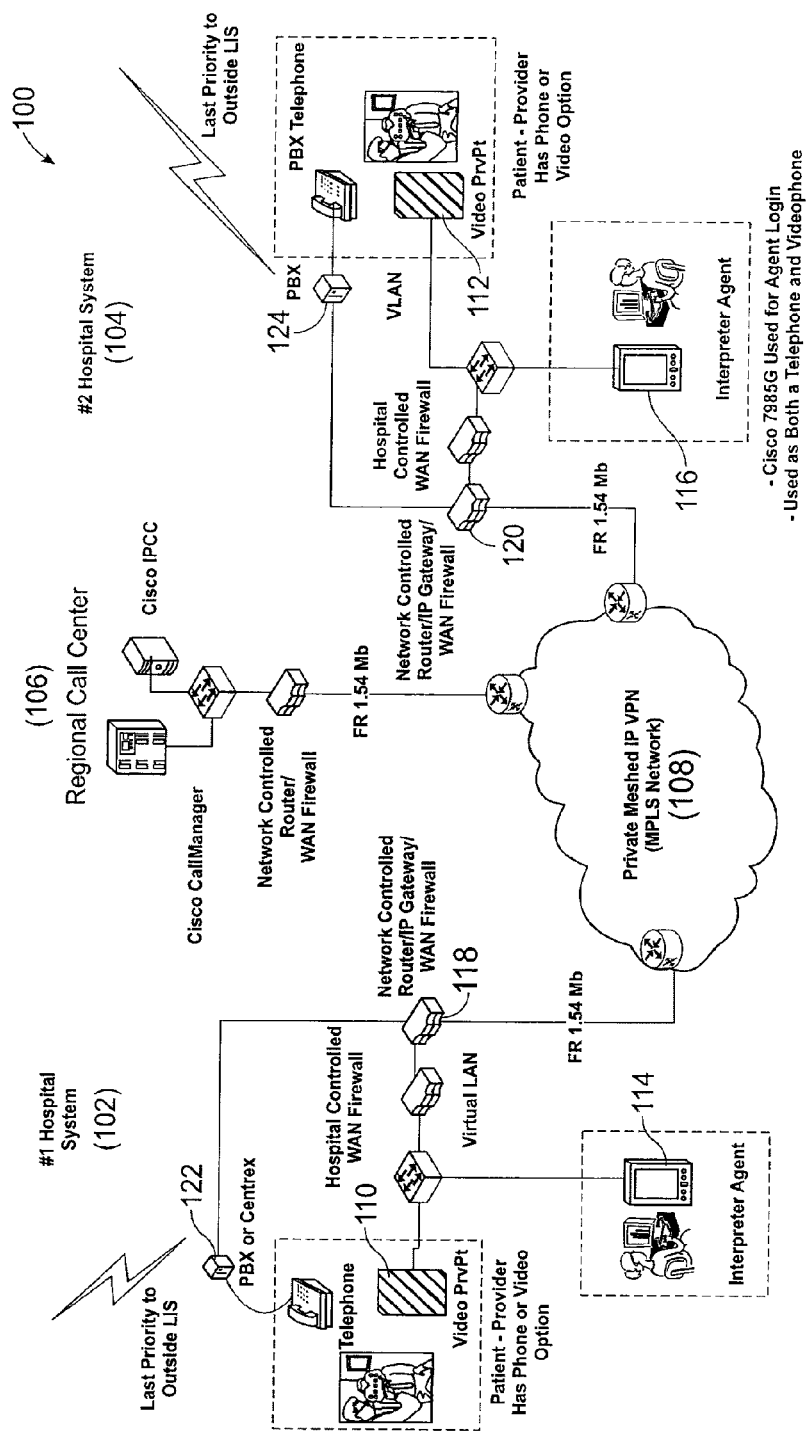
FIG. 1 illustrates a first call routing system in accordance with one embodiment of the present invention.

Systems and methods in accordance with embodiments of the present invention overcome the aforementioned and other deficiencies in existing communications and information routing systems. In one aspect, such a system can provide routing of communications that are audio and/or video based, such as by using an Internet or other similar protocol as the data transmission medium. Video and/or voice IP communications services can be provided across a Wide Area Network (or other network such as a LAN, VLAN, SAN, etc.) with functionality to assure reliable and secure communications. In one example, an open source Linux-based IP phone system such as Asterisk, available from Digium of Huntsville, Ala., can be used with such a system. A Video and Voice IP-based Call Center with unique automatic call distribution rules, for example, can intelligently route calls to the appropriate representatives, agents, information, media, or other location, person, or device. Representatives, for example, can use IP video devices to log in as representatives anywhere within the IP WAN to handle video and audio calls. Requestors of services or information can use video and/or audio devices to reach the representatives, either through native IP connectivity or through "IP translator" gateways. A Video and Voice Call Center can process communications based on at least one set of programmed rules, as well as data, profiles, customer-supplied information, and any other appropriate information. In one example, the rules are based on: the selection by a Requestor of the Language Needed, the Calling Entity, and other variables such as in-person requests, mental health information, and male/female representative preference. The representatives can be distributed to any of a number of locations, each location having as little as a single associated representative or agent, the representative(s) being either human or automated.

For explanation purposes, the various aspects and embodiments will be described with respect to an interpreter network, useful in a hospital or other setting, although it should be understood that such application is merely exemplary and advantages of the various embodiments can be obtained in many other applications for many other purposes as would be apparent to one of ordinary skill in the art in light of the description and suggestions contained herein. The specific examples should not be read as limiting the various embodiments or any claims thereto.

In one exemplary system where Interpreters are representatives/agents provided in a hospital network, Interpreters have "profiles" which can fill any of numerous specific rule requirements. When requestors make calls, information is obtained through prompts and/or using the target number that is called, whereby the requestor can be assigned into a language queue. The calls can be automatically detected for their origin location so that they can be properly classified. The Call Center software and/or hardware can match the profile of various available Interpreters with the Request for Interpretation call, and information associated therewith, and then route the call based on that information and a priority.

In one embodiment, a first priority is to determine whether the Interpreter Language matches the call request and whether the Interpreter is within the Calling Entity. For example, if a patient in a hospital dials into the system, the hospital can be recognized as the Calling Entity (from where the call originated or as associated with the number used to dial into the system, for example) and the system can give priority to an Interpreter within or associated with the hospital. This allows a Calling Entity, subscribing to or providing the system, to maximize the use of the Calling Entity's own interpreters, and save additional costs needed for external resources.

If no Interpreter associated with the Calling Entity is available after a short duration, a second priority in one example is to search for any Interpreters for a specified Language (or other skill) in any organizations or organizational units associated with, or specified by, the Calling Entity. For example, a hospital might be a member of a health care network that provides lower cost services to members, such that the hospital might prefer an in-network Interpreter if an in-house Interpreter cannot be reached. In another example, an associated network of organizations includes any entity and/or organization or organizational unit subscribing to the call routing network.

If no Interpreter is available among any such organization after a short time, a third priority can be to route the communication to an outside language interpretation service that has been the choice of the hospital system.

The search for an Interpreter can be limited to call centers or specific locations in some embodiments, but in other embodiments can be distributed in any appropriate way so that any representative ay any location can receive communications from the Call Center.

Once there is a match of the requirements of the needed Requestor call to an available Interpreter, the call can be connected between the two parties (the Requestor and the Interpreter). The media stream then can flow point to point.

The call, while in session, can provide data on call status to the Call Center. When the call is terminated, call signaling can be given to the Call Center. Data on the call (i.e., call length, etc.) then can be summarized and stored in an appropriate data storage location. The capture and storage of such information allows call detail reports and summaries to be generated, such as for billing and analysis. These can include information such as the usage of in-house interpreters handling in-house own requests, other entity requests, and the usage of other in-network interpreters to handle a Calling Entity's own requested needs.

Figure 2:
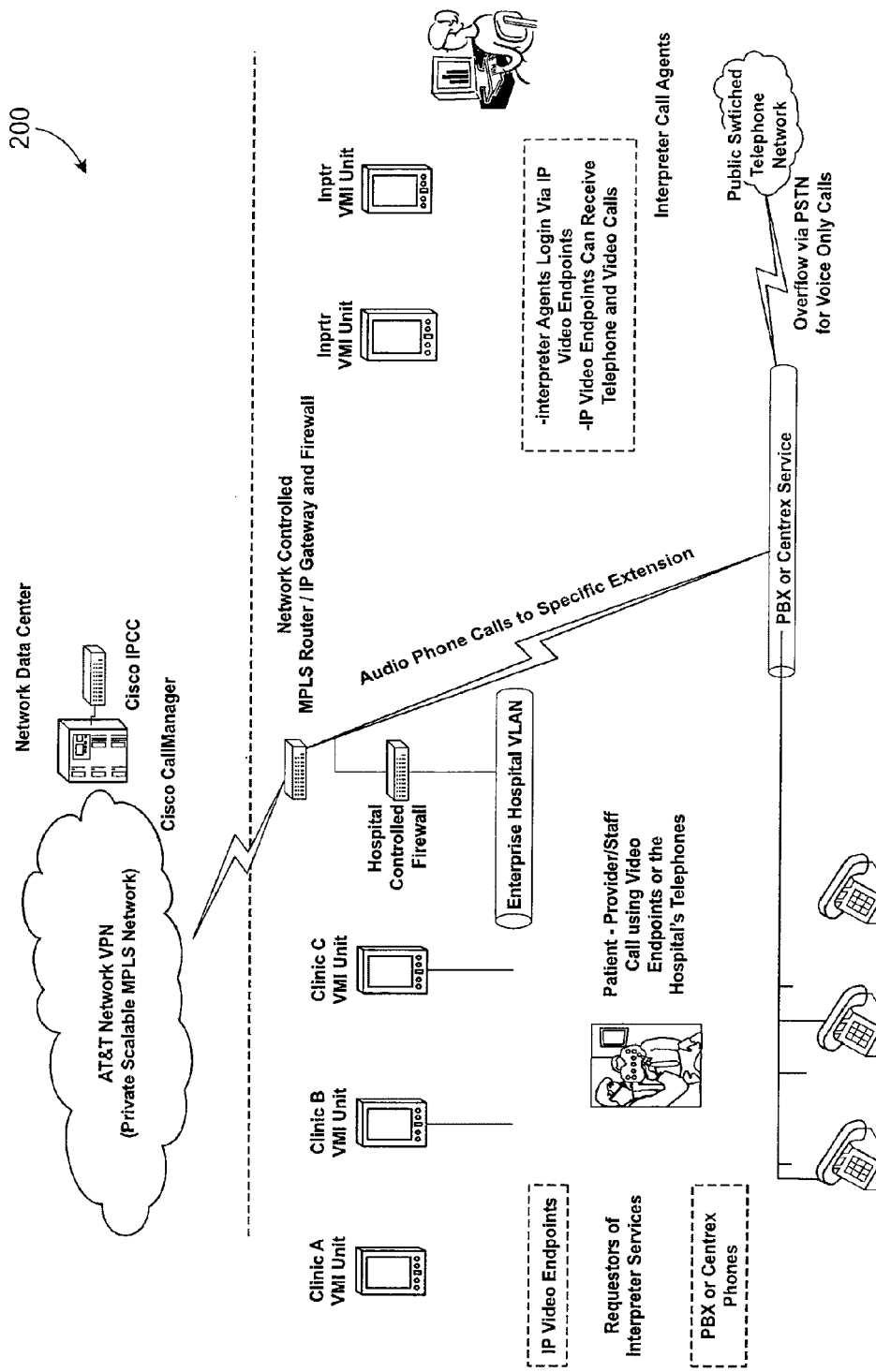
FIG. 2 illustrates a second call routing system in accordance with one embodiment of the present invention.

FIGS. 1 and 2 show exemplary system implementations that can be used to provide functionality such as that described above in accordance with various embodiments. FIG. 1 shows a system linking two hospital systems 102, 104 via a regional call center 106. FIG. 2 shows a similar system using a single hospital network topology.

The exchange of interpretative services in such systems can be based on a private Internet Protocol (IP) network 108 spanning the participating hospitals. In one embodiment, the video endpoint units 110, 112 and call center devices 114, 116 are on the IP network, with an IP to PBX telephone gateway 118, 120 to each hospital system's PBX system 122, 124. The IP video phones 114, 116 of the Interpreters can act as both audio and video phones on the network. Current telephones can be utilized by patient/providers, since the call is converted into an IP stream on its way to the IP video device.

The call center can provide "skills-based routing" of all calls to "logged in" interpreter call agents. In "skills-based routing," calls that may be best handled by a person with particular set of skills (e.g., a female Punjabi interpreter) can be appropriately routed. These interpreter call agents can be anywhere within the joint hospital system.

Exemplary patient/provider IP video endpoints operate on the SCCP (Skinny) Protocol. These endpoints can be Tandberg 1000 MXP for Cisco CallManager (T1000MXP-CM), Cisco 7985G Videophones, or Polycom VSX 3000 for CallManager, for example. In addition to the video endpoint itself, there can be a cart to which the video is secured, and a tether to keep the video remote control from being lost.

A number of potential patient/provider telephone units can be used for communication. These include, for example, PBX/Centrex phones of the hospital with a conference phone function, PBX/Centrex phones of a hospital with a 2-way phone handset attachment, a PBX/Centrex phone system with analog lines but installing a high-end conferencing phone (e.g. Polycom wired or wireless conference phone), and a PBX/Centrex phone system with analog lines but installing a 5.8 GHz Wireless phone (e.g. a Panasonic wireless phone).

For an exemplary interpreter station, an endpoint can be a recently released model of Cisco IP Video Phones, Cisco 7985G. Using these Cisco IP Video phones, Interpreters can login as call agents into the network system. Once logged in the phones can receive audio only, or audio plus video in their calls. In addition to the video device, a high quality headset and a work area with proper sound- and video-proofing can be necessary. For HIPAA compliant security and privacy the work areas must be properly video-proofed and afford confidentiality.

A system also can include at least one Interpreter Supervisor Station. Typically one person within the system is designated as an interpreter supervisor. This person can use a network-provided thin client workstation to login and access real-time data and reports of interpreter call agents of the hospital system.

For the Call Center, in order to execute Call Processing and Routing, a Cisco CallManager (CM) and IP Contact Center Express Enhanced (IPCC) server can be used for this Voice and Video over IP system. A Call Center can be hosted by a third party in a commercial Network Operations Center (NOC). This can insure dedicated technical support and the availability of an established disaster recovery services.

For IP Gateways to PSTN/Centrex/PBXs, audio only phone calls originating from a hospital PBX or Centrex system to the CM/IPCC network can be converted into IP data streams at the hospital systems' edge of the MPLS WAN. Cisco IP Gateway Routers convert PBX/Centrex calls to IP calls. The IP Gateway Router also can be used to traffic outbound calls to the backup voice-based private interpretation services (e.g., Language Line or other contracted language service provider of the hospital). This design allows each hospital system to select their own backup language service provider.

The network in one embodiment is a totally private and isolated IP network. There may be no public internet access through the network, and traffic can flow through local Virtual LANs and a private MPLS network.

In one example an AT&T Networked VPN (NVPN) is used to provide a Multi-Protocol Label Switched Network (MPLS). A fully meshed, high-speed, and scalable MPLS network links the hospital systems. Traffic on this network is dedicated to medical interpretation traffic. No other traffic is permitted. With a fully meshed network, traffic through the network can be optimized by distinguishing the call set up and the call traffic itself. The call set up is conducted between the hospital and the call center, but the call data stream itself is point-to-point. To start, assuming a maximum of 3 concurrent outside video calls (@450 kb each), a T1 equivalent (1.54 mb) is one possible installation from the hospital system to the MPLS WAN.

At the hospital, a dedicated VLAN can be used, such as a VLAN that is switch static port-based. IP addresses can be distributed from one's own internal network. A firewall and an edge router can separate the local network from the MPLS WAN. The network can assign the IP addresses to the hospital edge routers. The edge routers communicate with the Call Center across the private WAN. A sufficient number of switched ports and switches can be used to provide endpoint connectivity to video devices. 802.11b/g can be deployed but specific cards may be required by the video endpoint devices.

For security, data streams of IP video and audio can be AES encrypted from end-to-end. Endpoint security of the video devices can include the proper physical deployment and user training so as not to compromise patient confidentiality. Only that data traffic that is necessary for the network functions (SCCP IP stack) are allowed on the network in one embodiment. All firewalls and routers on the network are so configured. A vulnerability assessment can be conducted before each hospital deployment of the system. Systems are in place to identify unauthorized use and intrusion into the network. Regular security reports and audits can be conducted.

Redundancy can be implemented, such as using a second real-time CallManager server. A "swap-out" back up IPCC server also can be used, as well as a back up data network.

Call Flows

Figure 3:
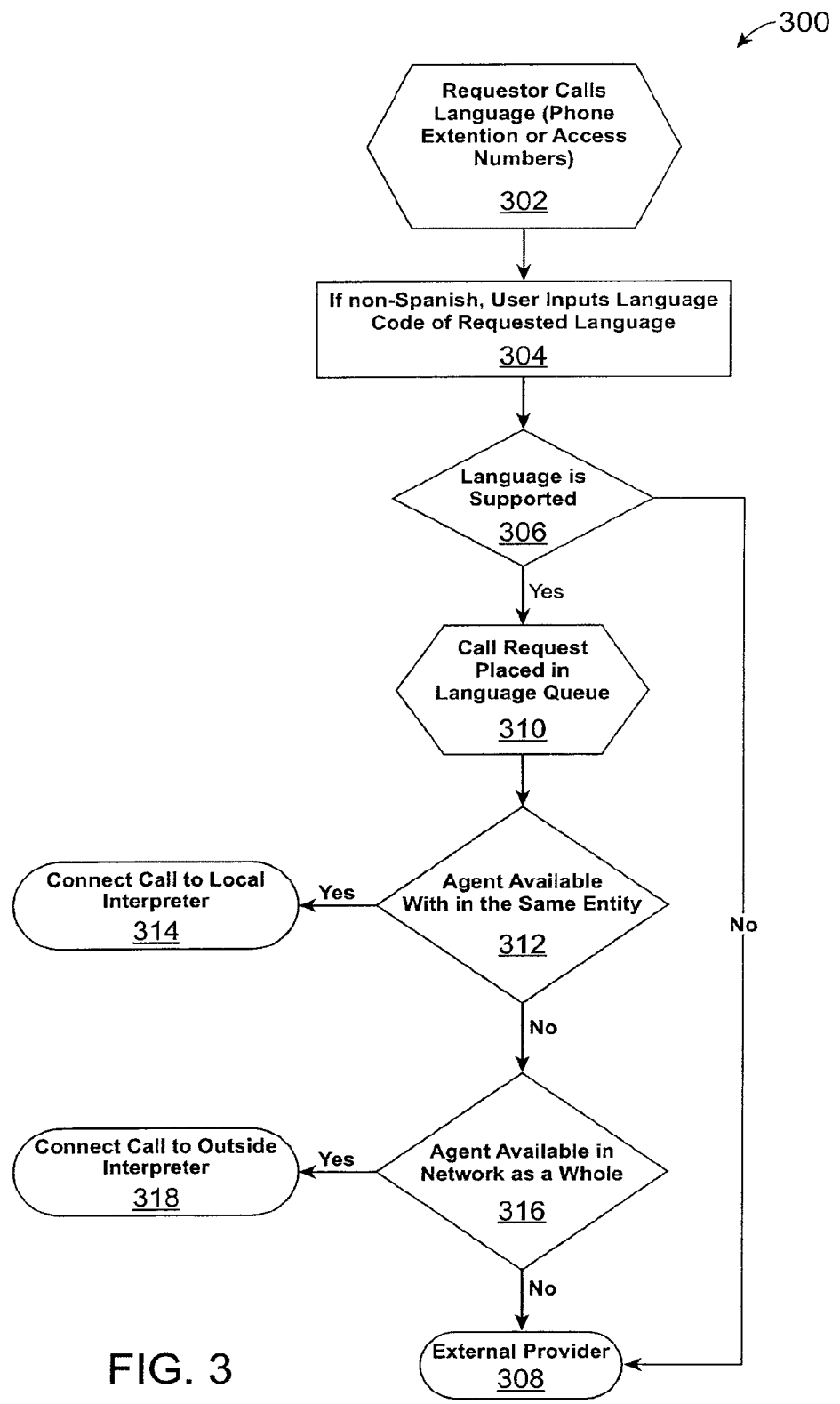
FIG. 3 illustrates a first call routing flow that can be used in accordance with one embodiment of the present invention.
Figure 4:
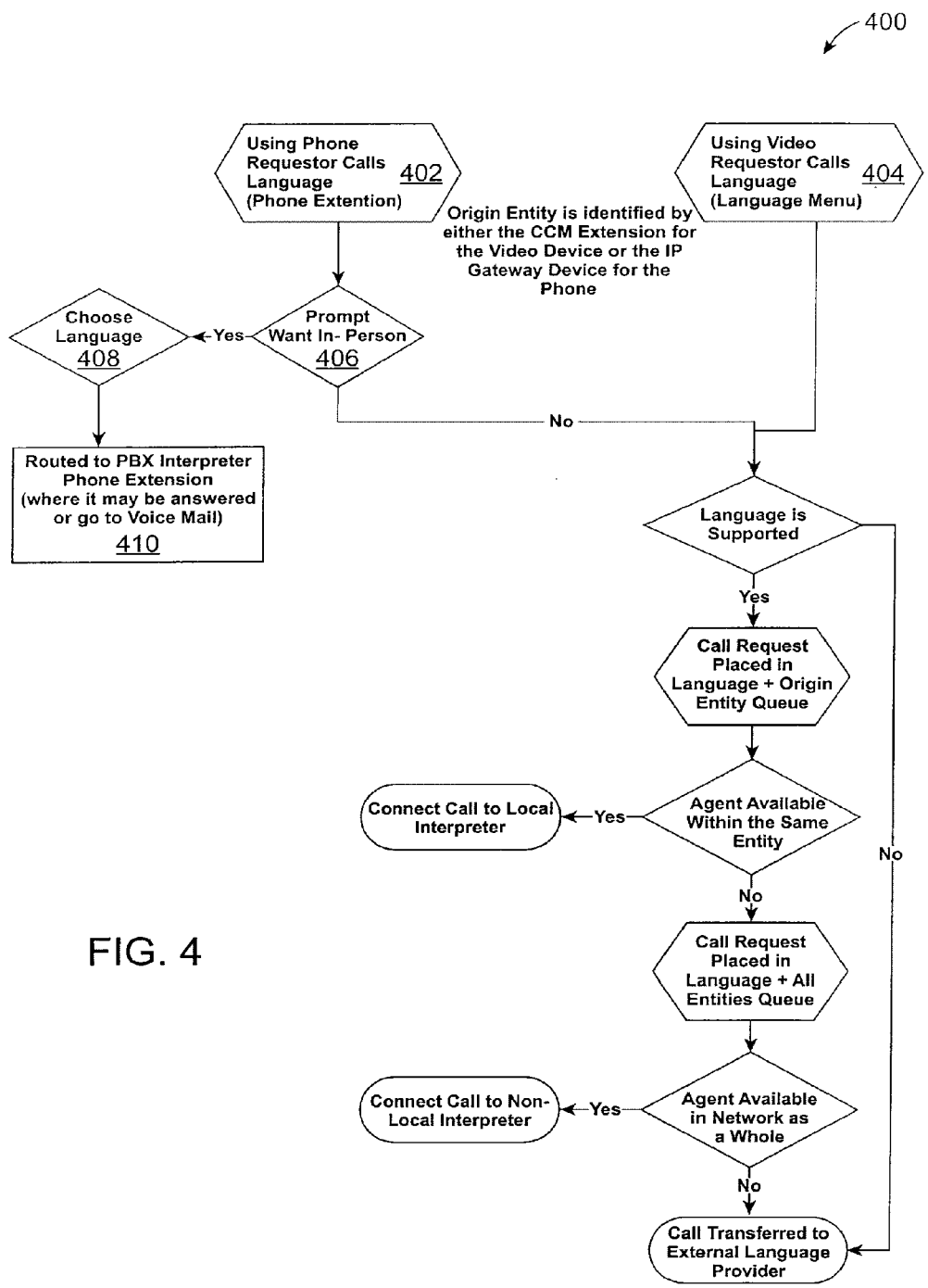
FIG. 4 illustrates a second call routing flow that can be used in accordance with one embodiment of the present invention.

FIGS. 3 and 4 show exemplary network call flows for systems such as those described above. In the flow 300 of FIG. 3, a requestor can call a specific number or extension for a specific language, or can call a general number and if the desired language is not the default (in this example Spanish) 302. If necessary, then the user can input a language code (or speak the name of the language, respond to a prompt, etc.) for the requested language 304. A check is made to determine whether the language is supported 306. If the language is not supported by the network, the call can be transferred to an external language provider 308. If the language is supported, the call can be placed in a language queue 310. If an interpreter within the entity, and having a matching language skill in the interpreter profile, becomes available within a certain amount of time 312, the call is connected to that interpreter 314. Else, if an interpreter within any entity in the network as a whole is available within a certain period of time 316, the call is connected to that interpreter 318. Else, the call is transferred to an external language provider (or external language provider queue(s)) 308.

In the flow 400 of FIG. 4, a Requestor calls in using a phone 402 or video device 404. If the Requestor places an audio call (or in some embodiments a video call) and wants an in-person interpreter 406, the appropriate language is chosen 408 and the call is routed to an appropriate extension 410. If the requestor does not want an in-person interpreter, the call flow can continue as in FIG. 3, or can go into specific queues for language and entity(ies), etc., as shown.

In other exemplary flows and systems, there can be additional levels or layers in the priority hierarchy for call routing. For example, a hospital in a town such as Los Angeles might set a first priority to check that hospital for an available Spanish interpreter. A second priority might be to check the southern California region, followed by a third priority to check the state of California. A fourth priority might then be to route to an outside language service independent of location. As can be seen, such an approach allows an entity to specify any number of priorities, levels, or layers for routing information or calls, wherein each layer can have attributes specified by that entity. These additional layers can be sub-networks, separate networks, portions of networks, specific entities, etc., as would be apparent to one of ordinary skill in the art in light of the teachings and suggestions contained herein.

FIG. 5 illustrates an exemplary billing statement 500 that can be issued in accordance with various embodiments discussed herein. As can be seen the number of calls that are handled "internally," or by the representatives of the entity receiving the statement, are not charged as the entity handles payment for its own services. Calls sent by that entity to other network interpreters, where the representatives for the entity were not available or did not have the necessary skill(s) to handle the call, are shown as debits to the account of that entity, as the entity has to pay for the outside services. Further, calls referred to that entity from other network users appear as credits, as the entity is able to charge for services provided to other network users. Other billing and credit approaches can be used as would be understood to one of ordinary skill in the art.

Aspects of the present invention can be stored as program code in hardware and/or software. Storage media and computer readable media for containing code, or portions of code, for implementing aspects and embodiments of the present invention can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of routing calls through successive layers of providers that are associated with separate entities that are part of organizational units, the organizational units connected via an IP (Internet Protocol) data network that is connected to a call center, the method comprising:

receiving a call from a requestor, the call originating from an entity and requiring a particular skill of a representative;

routing the call to a representative of the entity logged-in to the call center when the representative of the entity has that particular skill and is available to take the call;

when the representative of the entity is not available to take the call, routing the call to a representative of an organizational unit associated with the entity when the representative of the organizational unit has that particular skill and is available to take the call, wherein the representative of the organizational unit associated with the entity is also logged-in to the call center;

when the representative of the entity and the representative of the organizational unit are not available to take the call, routing the call to a representative outside the organizational unit when the representative outside the organizational unit has that particular skill and is available to take the call, wherein the representative outside the organizational unit is also logged-in to the call center;

receiving a second call from a second requestor, the second call originating from a second entity and requiring a particular skill of a representative;

routing the second call to a representative of the second entity when the representative of the second entity has that particular skill and is available to take the second call;

when the representative of the second entity is not available to take the second call, routing the second call to the representative of the entity when the representative of the entity has that particular skill and is available to take the second call, wherein the entity and the second entity are both associated with the organizational unit; and when the representative of the second entity and the representative of the entity are not available to take the second call, routing the second call to the representative outside the organizational unit when the representative outside the organizational unit has that particular skill and is available to take the second call;

debiting an account associated with the entity when the call is routed to the representative of the second entity; and crediting the account associated with the entity when the second call is routed to the representative of the entity.

2. The method according to claim 1, wherein the particular skill is the ability to speak a specified language, and the representative of the entity is an interpreter.

3. The method according to claim 1, wherein the call requires a plurality of skills.

4. The method according to claim 1, wherein routing the call to the representative of the entity comprises routing the call via a local network corresponding to the entity, wherein the local network is behind a firewall that connects the local network to a private MPLS (Multi-Protocol Label Switched) network.

5. The method according to claim 1, wherein the call is an IP video call.

6. The method according to claim 1, wherein when the call originates at the entity and the representative of the entity is available to take the call, then there is no credit or debit to the account associated with the entity for the call.

7. A system for routing calls through successive layers of providers that are associated with separate entities that are part of organizational units, the organizational units connected via an IP (Internet Protocol) data network that is connected to a call center, the system comprising:

a call receiving device operable to receive a call from a requestor, the call originating from an entity and requiring a particular skill of a representative;

a second call receiving device operable to receive a second call from a second requestor, the second call originating from a second entity and requiring a particular skill of a representative;

a call router operable to:

route the call to a representative of the entity logged-in to the call center when the representative of the entity has that particular skill and is available to take the call, route the call to a representative of an organizational unit associated with the entity when the representative of the entity is not available to take the call and when the representative of the organizational unit has that particular skill and is available to take the call, wherein the representative of the organizational unit associated with the entity is also logged-in to the call center, and route the call to the representative outside the organizational unit when the representative of the entity and the representative of the organizational unit are not available to take the call and when the representative outside the organizational unit has that particular skill and is available to take the call, wherein the representative outside the organizational unit is also logged-in to the call center; and a second call router operable to:
route the second call to a representative of the second entity when the representative of the second entity has that particular skill and is available to take the second call;
route the second call to the representative of the entity when the representative of the second entity is not available to take the second call and when the representative of the entity has that particular skill and is available to take the second call, wherein the entity and the second entity are both associated with the organizational unit; and
route the second call to the representative outside the organizational unit when the representative of the second entity and the representative of the entity are not available to take the second call and when the representative outside the organizational unit has that particular skill and is available to take the second call;
wherein an account associated with the entity is debited when the call is routed to the representative of the second entity; and
wherein the account associated with the entity is credited when the second call is routed to the representative of the entity.

8. The system according to claim 7, wherein the particular skill is the ability to speak a specified language, and the representative of the entity is an interpreter.

9. The system according to claim 7, wherein the call requires a plurality of skills.

10. The system according to claim 7, wherein routing the call to the representative of the entity comprises routing the call via a local network corresponding to the entity, wherein the local network is behind a firewall that connects the local network to a private MPLS (Multi-Protocol Label Switched) network.

11. The system according to claim 7, wherein the call is an IP video call.

12. The system according to claim 7, wherein when the call originates at the entity and the representative of the entity is available to take the call, then there is no credit or debit to the account associated with the entity for the call.

13. A computer program product embedded in a non-transitory computer readable medium for routing calls through successive layers of providers that are associated with separate entities that are part of organizational units, the organizational units connected via an IP (Internet Protocol) data network that is connected to a call center, comprising:
computer program code for receiving a call from a requestor, the call originating from an entity and requiring a particular skill of a representative;
computer program code for routing the call to a representative of the entity logged-in to the call center when the representative of the entity has that particular skill and is available to take the call;
computer program code for routing the call to a representative of an organizational unit associated with the entity when the representative of the entity is not available to take the call and when the representative of the organizational unit has that particular skill and is available to take the call, wherein the representative of the organizational unit is also logged-in to the call center;
computer program code for routing the call to a representative outside the organizational unit center when the representative of the entity and the representative of the organizational unit are not available to take the call and when the representative outside the organizational unit has that particular skill and is available to take the call, wherein the representative outside the organizational unit is also logged-in to the call center;
computer program code for receiving a second call from a second requestor, the second call originating from a second entity and requiring a particular skill of a representative;
computer program code for routing the second call to a representative of the second entity when the representative of the second entity has that particular skill and is available to take the second call;
computer program code for, when the representative of the second entity is not available to take the second call, routing the second call to the representative of the entity when the representative of the entity has that particular skill and is available to take the second call, wherein the entity and the second entity are both associated with the organizational unit;
computer program code for, when the representative of the second entity and the representative of the entity are not available to take the second call, routing the second call to the representative outside the organizational unit when the representative outside the organizational unit has that particular skill and is available to take the second call;
computer program code for debiting an account associated with the entity when the call is routed to the representative of the second entity; and
computer program code for crediting the account associated with the entity when the second call is routed to the representative of the entity.

14. The computer program product according to claim 13, wherein the particular skill is the ability to speak a specified language, and the representative of the entity is an interpreter.

15. The computer program product according to claim 13, wherein routing the call to the representative of the entity comprises routing the call via a local network corresponding to the entity, wherein the local network is behind a firewall that connects the local network to a private MPLS (Multi-Protocol Label Switched) network.

16. The computer program product according to claim 13, wherein the call is an IP video call.

17. The computer program product according to claim 13, wherein when the call originates at the entity and the representative of the entity is available to take the call, then there is no credit or debit to the account associated with the entity for the call.

* * * * *